Nov. 23, 1965   G. L. PRESSMAN ETAL   3,219,035
BLOOD PRESSURE MEASURING TRANSDUCER
Filed May 6, 1963   2 Sheets-Sheet 1

GERALD L. PRESSMAN
PETER M. NEWGARD
JOHN J. EIGE
   INVENTORS.

BY Samuel Lindenberg
   ATTORNEY

GERALD L. PRESSMAN
PETER M. NEWGARD
JOHN J. EIGE
INVENTORS.

BY Samuel Lindenberg

ATTORNEY

United States Patent Office  3,219,035
Patented Nov. 23, 1965

3,219,035
BLOOD PRESSURE MEASURING TRANSDUCER
Gerald L. Pressman, Mountain View, and Peter M. Newgard and John J. Eige, Redwood City, Calif., assignors to Stanford Research Institute, Palo Alto, Calif., a corporation of California
Filed May 6, 1963, Ser. No. 278,225
4 Claims. (Cl. 128—2.05)

This invention relates to transducers for measuring blood pressure and more particularly to a transducer which can be used for continuous external measurement of arterial blood pressure.

The invention described herein was made in the performance of work under a NASA contract and is subject to the provisions of the National Aeronautics and Space Act of 1958, Public Law 85-568 (72 Stat. 426; 42 U.S.C. 2451), as amended.

At present there are two techniques commonly employed to obtain arterial blood pressure measurements. In one of these a sphygmomanometer is used. This instrument provides only intermittent measurement of systolic and diastolic levels. The other technique uses intra-arterial catheterization and requires surgical procedures that limit the application to clinical environments. A number of attempts have been made to measure blood pressure by other methods, including the measurement of arterial distension, pulse wave velocity, and of ophthalmic artery occlusion, and the use of fingertype sphygmomanometers. The first two of these are still experimental, while the latter two types are commercially available. However, these latter two types usually provide an intermittent systolic measurement only.

An object of this invention is the provision of an externally used transducer which provides continuous measurement of the arterial blood pressure.

Another object of this invention is the provision of a novel, blood pressure measuring transducer which is relatively insensitive to normal subject movements.

Another object of the present invention is the provision of blood pressure measuring transducer which is externally applied and which does not appreciably interfere with subject activity.

Still another object of the present invention is the provision of a novel, useful transducer which can measure arterial blood pressure externally and continuously.

These and other objects of the present invention are achieved by providing a transducer which can measure the force required to restrain the distension of a superficial artery. The transducer has an arterial rider member which is applied to an artery with insufficient force to occlude the artery. This arterial rider member transmits the force of the arterial pressure to a deformable beam to which a strain gage measuring device is attached. The bend of the beam, which is caused by the arterial pressure transmitted through the arterial rider, is measured by the strain gage which provides a signal representative thereof which can be indicated on a suitably calibrated meter.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
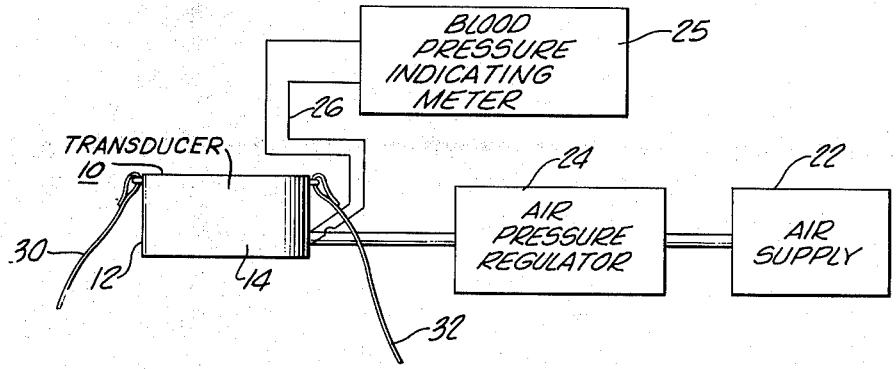
FIGURE 1 shows the external appearance of the transducer and the associated equipment required for providing a continuous external measurement of arterial blood pressure in accordance with this invention.
Figure 2:
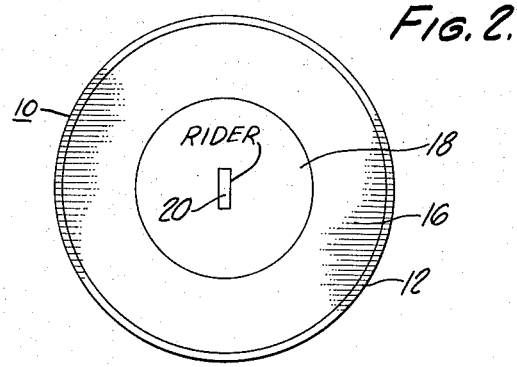
FIGURE 2 is a view of the operative face of the transducer which is applied to the body at the arterial location.

Reference is now made to FIGURES 1 and 2 which respectively show the transducer and associated equipment for measuring blood pressure and the operative face of the transducer. The transducer comprises a hollow container or housing, 12, having rigid walls except for one face 14, which is designated as the operative face. The operative face 14 includes a diaphragm 16 of a resilient material such as silicone rubber. The diaphragm has an opening in the center. The outer end of the diaphragm is bonded to the housing walls and its center is bonded to and supports, a base member 18. Extending through an opening in the base member is the face of an arterial rider member 20.

Air under pressure is introduced into the interior region of the housing 12 from an air supply 22 through an air pressure regulator 24, which maintains this air pressure constant. The blood pressure is indicated on a blood pressure indicating meter 25 which is connected by leads 26, to the measuring apparatus which is within the housing. A pair of straps respectively 30, 32, are employed for attaching the transducer in place for the purpose of measuring blood pressure. For example, these straps may be tied around the arm of a person to hold the transducer in place over an artery, or adhesive tape or bandage may be employed together with the straps, for tying the transducer in place over an artery on some other portion of the anatomy.

Figure 3:
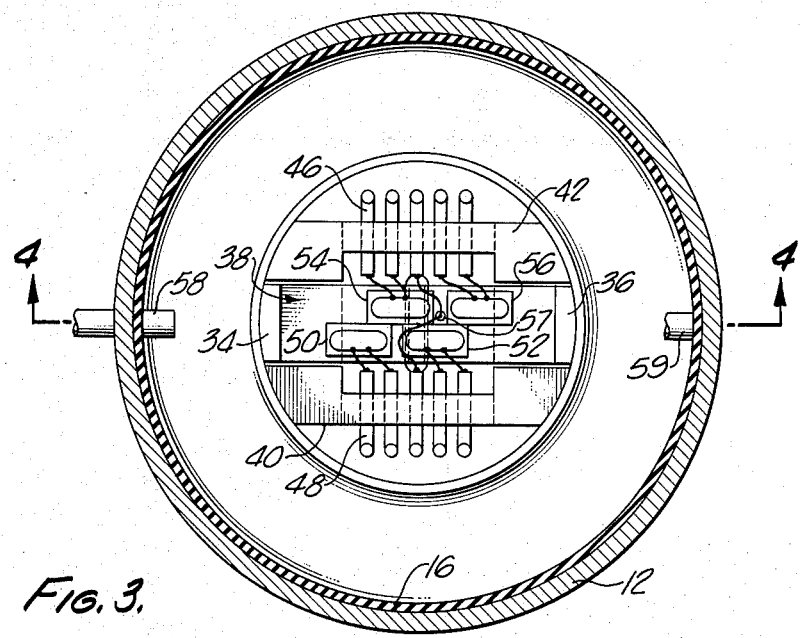
FIGURE 3 is a view through the top of the transducer with the top cover removed.
Figure 4:
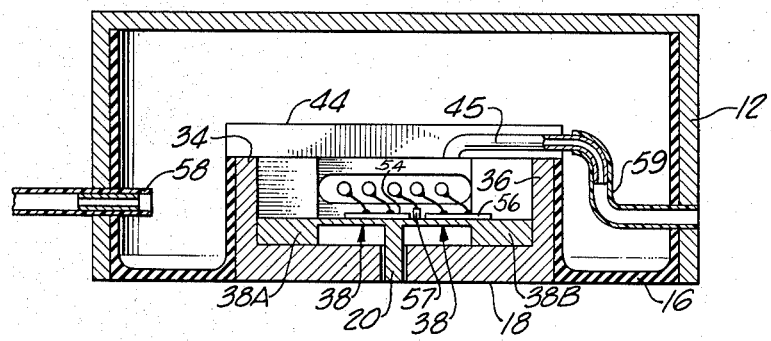
FIGURE 4 is a cross sectional view of the transducer along the lines 4—4 of FIGURE 3.

Reference is now made to FIGURES 3 and 4 which show respectively a top view of the transducer and a view in cross-section along the lines 4—4 of FIGURE 3. The walls of the housing 12 have a circular cross-section. The base member 18 comprises a circular plate with an opening in its center through which the arterial rider 20 extends. At opposite sides of the circular base plate and extending therefrom, are two support members respectively 34, 36. A beam 38, which is given a double cantilever beam configuration, is fitted in the space between the two side support members 34, 36. The arterial rider member 20, may be made a part of the beam 38, as shown, or may be a separate member which may then be attached to the beam.

The beam and rider have a T-shaped cross section, with the beam comprising the top of the T and the arterial rider the post. The outer ends of the beam respectively designated as 38A and 38B, are thickened to rest on the base plate 18. Abutting the thickened beam ends on either side, to hold the beam in place, are two-U-shaped side plate members respectively 40, 42. These side plate members effectively extend to the same height as the side support members 34, 36. A cover 44 which bridges the side plates 40, 42, and the side support members 34, 36, serves to prevent a leakage of the air used for applying pressure to the interior of the transducer through the opening for the arterial rider. The side plates 40, 42, each contain feed-through terminals respectively 46, 48, for enabling electrical connections to be made with four strain gages respectively 50, 52, 54, 56, and a thermistor 57, which are mounted on the top of the beam 38. The wiring is then taken from the feed-through terminals and brought out through an opening in the housing wall through which sleeving 58 extends to be connected to the electrical meter 25. Air, from the air supply source 22, is also fed into the housing through the sleeving 58. An opening 45 in the top member 44 is connected by means of tubing 59 to another hole in the housing wall. The purpose of this structure is to provide a vent to the atmosphere for the top side of the beam 38. This insures that the only forces acting on the beam are those due to arterial pressure transmitted through the arterial rider.

The diaphragm 16 as shown in FIGURE 4, is bonded to the base plate 18 and to the side members 34, 36.

Figure 5:
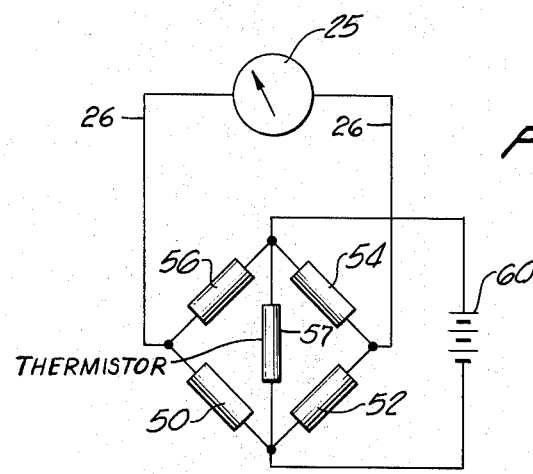
FIGURE 5 is a circuit diagram illustrating how the strain gages are interconnected to indicate blood pressure.

FIGURE 5 shows the circuit connections for the four strain gages. They are connected in the form of a bridge with each side of the bridge containing two strain gages on opposite sides of the arterial rider member. A battery 60 applies potential across two terminals of the bridge and the other two terminals of the bridge are connected to the meter 25. The change in meter reading, indicative of change in bridge unbalance with and without pressure from an artery applied to the arterial rider indicates the pressure of the blood in the artery.

Since the unbalance of the bridge is brought about by bending of the transducer beam due to the arterial pressure, the unbalanced reading may be calibrated in terms of such pressure. Assume that the bridge arrangement shown in FIGURE 5 is in balance before the transducer is applied to the artery of the subject. Pressure of the blood against the artery wall causes the artery wall to resist any deformation with a forces which is dependent upon the pressure. Thus, when the transducer is mounted in position over the artery, pressure of that artery on the arterial rider deforms the beam attached to the arterial rider. Such deformation is measured by the strain gauges in the form of a bridge circuit shown in FIGURE 5. This causes an unbalance of the bridge circuit, the measurement of which is calibrated in terms of blood pressure.

In order to use the transducer, it is attached to the member containing the artery in which the blood pressure is to be measured. The transducer is positioned so that the arterial rider extends over the artery. Air pressure is applied to the interior of the transducer from the air supply through the air pressure regulator. The air pressure regulator maintains the pressure constant in the air chamber formed by the interior of the housing with the rubber membrane at its operating face. Provided that the diaphragm lies tangent to the skin surface at all edges of the transducer, i.e., it is flattened against the skin, the diaphragm can exert no component of tension normal to the skin and therefore cannot influence transducer loading. There remains only the constant pressure acting over area of the transducer to provide the loading force. A change in strap tension may radically change the force exerted, but this will only result in a change in the flattened area of the diaphragm to provide the proper reaction force. The transducer is restrained from translation and rotation by friction between the rubber diaphragm and the skin. Although, the pressure used is small (about 20 to 40 inches of water), its effect is sufficient to provide adequate restrain to overcome lateral forces transmitted through the flexible diaphragm from the box to the transducer.

In determining the size of the components which are employed in the transducer in accordance with this invention, preliminary calculations show that a transducer rider with 0.030 inch and a length of 0.125 inch would be a reasonable size to fit the radial artery and would allow the use of available semi-conductor strain gages. A free skin deflection of approximately 100 microinches was assumed to exist due to a pulse pressure amplitude of 40 millimeters of mercury from an artery.

Gages were chosen having a nominal gage factor of 110, a resistance of 120 ohms, and an active gage length of 0.050 inch. The temperature sensitivity was about 1 microinch per inch per degree Farenheit. The temperature sensitivity of the gages is small, but if desired this may be compensated for by using the bridge arrangement shown in FIGURE 5 and, including the thermistor 57 which is positioned on the beam and to which connection can be made to use the thermistor resistance vs temperature characteristic in a well known manner to compensate for the temperature variations of the output of the strain gages.

A double cantilever beam configuration for the beam was chosen to allow placing all four gages on one surface, and to facilitate construction. The four strain gages are positioned to receive the maximum average strain available in both tension and compression. Beam length and width are chosen to accommodate the available gages.

The stiffness of a double cantilever beam can be expressed in terms of beam width, W; length, L; thickness, $t$; and the Young's modulus of the material, E, as follows:

$$K_1 = 16 E W \frac{]t_e]}{L}$$

An equivalent arterial stiffness can be defined in terms of arterial pulse pressure, P; the free skin deflection resulting from the pulse pressure, $d$; and the arterial rider area, A:

$$K_2 = \frac{PA}{d}$$

On the assumption that the transducer stiffness should be approximately ten times greater than the physiological system, the two relations can be combined to give:

$$\frac{t}{L} = \left[\frac{5}{8} \frac{PA}{EWd}\right]^{1/3}$$

The beam dimensions chosen give an area $$A = 3.75 \times 10^{-3}$$

square inches. Free skin deflection of the radial artery has been measured at about $100 \times 10^{-6}$ inches. With Pulse pressure _____ p.s.i__ 2
Young's modulus (aluminum) _____ p.s.i__ $10 \times 10^6$
Beam length _____ inches__ 0.220
Beam width _____ do____ 0.125 the beam thickness required is $$t = 0.220 \frac{5 \times 2 \times 3.75 \times 10^{-3}}{8 \times 10 \times 10^6 \times 0.125 \times 100 \times 10^{-6}}^{1/3} =$$

$$7.37 \times 10^{-3} \text{ inches}$$

With the strain-gage configuration shown in FIGURE 3, the average strain imposed on each gage will be about ½ of maximum strain. Using this approximation, the strain level experienced by each gage is given by the relation:

$$\text{Effective strain, } \epsilon = 0.514 \left[\frac{PA}{EW}\right]^{1/3} \frac{(d)^{2/3}}{L}$$

using the same values for P, A, E, W, L, $d$ as in the previous calculation results in:

$\epsilon = 9.2$ microinch per inch for 2-p.s.i. arterial pulse pressure, or 0.089 microinch per inch per mm. Hg.

When measured by a strain-gage bridge with four active elements and 2.5 volts of bridge excitation, the resulting voltage sensitivity ($E_0$) should be:

$$E_0 = \frac{V}{4}(N)(GF)\epsilon$$

$$E_0 = \frac{2.5}{4}(4)(110)(0.089) \times 10^{-6} =$$

$$24.5 \times 10^{-6} \text{ volts per mm. Hg}$$

where $V$=excitation voltage, $N$=number of active gages, and $GF$=gage factor.

The foregoing values for the strain gages and the rider dimensions are given by way of example and should not be construed as a limitation upon the invention. Further, by way of example and not to serve as a limitation upon the invention, in an embodiment of the invention which was built, the strain gage beam was made of aluminum and was given an effective length of 0.220 inch with a thickness of 0.007 inch and a width of 0.125 inch. As indicated, the beam includes the arterial rider as an integral part, however, this need not be the case. Epoxy adhesive was used to mount the beam on the base plate and between the side plates. The strain gages and thermistor were fastened to the top of the beam with epoxy cement.

The base plate was milled from aluminum also. The side plates were also made of aluminum and they serve to provide support for the beam and to hold the feed through electrical connector groups.

After assembly, the transducer face is polished flat to present a smooth flush surface to the skin. The transducer top 44, is installed after the wiring using silicone rubber as a cement. The container, in the embodiment of the invention which was built, consisted of aluminum with an O.D. of 1 inch and a 1/32 wall thickness and was 7/16 of an inch high. As previously pointed out, the diaphragm was molded of silicone rubber and had a thickness of 0.015 inch. During the molding operation the diaphragm was bonded to both the outer container and the base member.

An essential part of all measuring systems is the method of calibration. Ideally, an absolute calibration is the most convenient. In this form the calibration is performed on the instrument before it is used and remains constant, independent of the individual or occasion. This method of calibration appears feasible with a highly developed form of a high spring rate direct force transducer. The requirements on the measuring system, in order to be able to use the above form of calibration are, that the arterial surface below the transducer must be flat, and the flattened area of the artery must cover the entire measuring surface (arterial rider face) of the transducer. Under these conditions, the transducer can be calibrated by means of an "artery simulator" which consists of an extensible rubber membrane that may be pressurized to a known pressure level. The transducer is mounted against the rubber membrane and the output signal is recorded as a function of the applied pressure. Other methods of calibration will become apparent to those well skilled in the art.

There has been described herein above, a novel, useful, transducer for the external continuous measurement of arterial blood pressure. While the embodiment of the invention has been shown using a T-shaped beam and arterial rider structure and uses a plurality of strain gages, this is by way of illustration and not as a limitation on the invention. For example, the beam may be a single, uniform thickness, member supported by pins at both ends, and the arterial rider may be a block of material which is urged against the center of the beam. A single strain gage may be employed instead of a plurality thereof, although a somewhat better performance is obtained with a plurality of gages disposed in the circuit shown.

We claim:
1. A transducer for the continuous external measurement of arterial blood pressure comprising a container having all of the walls thereof rigid and having one open surface, a flexible diaphragm connected to the walls at said one surface and closing said one surface except at the center thereof, a second container fitting within said first container, having an open surface, means for supporting said second container from said diaphragm with its open surface at the opening in said diaphragm, a flexible beam member, means for supporting said flexible beam member at both ends within said second container, an arterial rider member extending from the center of said beam member to the opening in said open surface, said arterial rider member consisting of a rectangular block positioned with its long dimension transverse to the flexible beam long dimension, means for introducing air under pressure into said first container, means for measuring the deflection of said flexible beam in response to pressure applied thereto through said arterial rider, and means for providing an indication of the deflection of said flexible beam.

2. A transducer for the continuous external measurement of arterial blood pressure comprising a base plate member having an opening at the center thereof, a deformable beam member, means supporting said deformable beam member on the ends thereof at one side of said base plate member and across the opening in the center thereof, arterial rider means extending from said deformable beam member through the opening in said base plate member to the other side of said base plate member, for deforming said beam when said arterial rider means is pressed against an artery, a strain gage mounted on said deformable beam member for measuring its deformation and providing an output signal indicative thereof, and means to which said base plate member is attached for resiliently supporting said base plate member including walls forming a hollow container having an open face, a resilient diaphragm having a central opening to the edges of which said base plate member is attached and extending therefrom to said walls to close said open face, said base plate being attached to said diaphragm to position said deformable beam member within said housing, and means for applying a pneumatic pressure to said diaphragm.

3. A transducer for the continuous external measurement of blood pressure comprising a base plate member having an opening at the center thereof and two side members extending from opposite sides of said base plate member and at right angles thereto, a deformable beam member having a substantial T-shaped cross section, the end portions of the top of said T being thicker in cross section than the remainder, said beam member being positioned on said base plate member with the top of said T extending between said side members and the post of said T extending through the center opening in said base plate member to the other side of said base plate member, means including a pair of U-shaped members positioned on either side of said beam member for holding it on said base plate member, said U-shaped members abutting said beam member at the ends of the top of said T, and having a cross section which is thicker than said beam member, a top plate member covering said pair of U-shaped members and extending over said beam member, a strain gage mounted on said deformable beam member for providing an output signal indicative of the deformation thereof, and diaphragm means for resiliently supporting said base plate member.

4. A transducer as recited in claim 3 wherein said diaphragm means for resiliently supporting said base plate includes walls forming a hollow container having an open face, a resilient diaphragm having a central opening to the edges of which said base plate member is attached and extending therefrom to said walls to close said open face, said base plate being attached to said diaphragm to position said deformable beam member within said housing, and means for applying pneumatic pressure to said diaphragm.

References Cited by the Examiner
UNITED STATES PATENTS

| | | | |
|---|---|---|---|
| 2,472,045 | 5/1949 | Gibbons | 73—398 |
| 2,510,073 | 6/1950 | Clark | 128—2.05 X |
| 2,958,056 | 10/1960 | DiGiovanni | 73—398 X |
| 3,099,262 | 7/1963 | Bigliano | 128—2.05 |
| 3,102,534 | 9/1963 | Bigliano | 128—2.05 |
| 3,123,068 | 3/1964 | Bigliano | 128—2.05 |
| 3,154,067 | 10/1964 | Stenstrom | 128—2.05 |
| 3,189,023 | 6/1965 | Salz et al. | 128—2.05 |

RICHARD A. GAUDET, *Primary Examiner.*

LOUIS R. PRINCE, SIMON BRODER, *Examiners.*